Aug. 7, 1923.
H. GUYER ET AL
1,464,277
REFRIGERATING MACHINE
Filed May 8, 1922
2 Sheets-Sheet 1
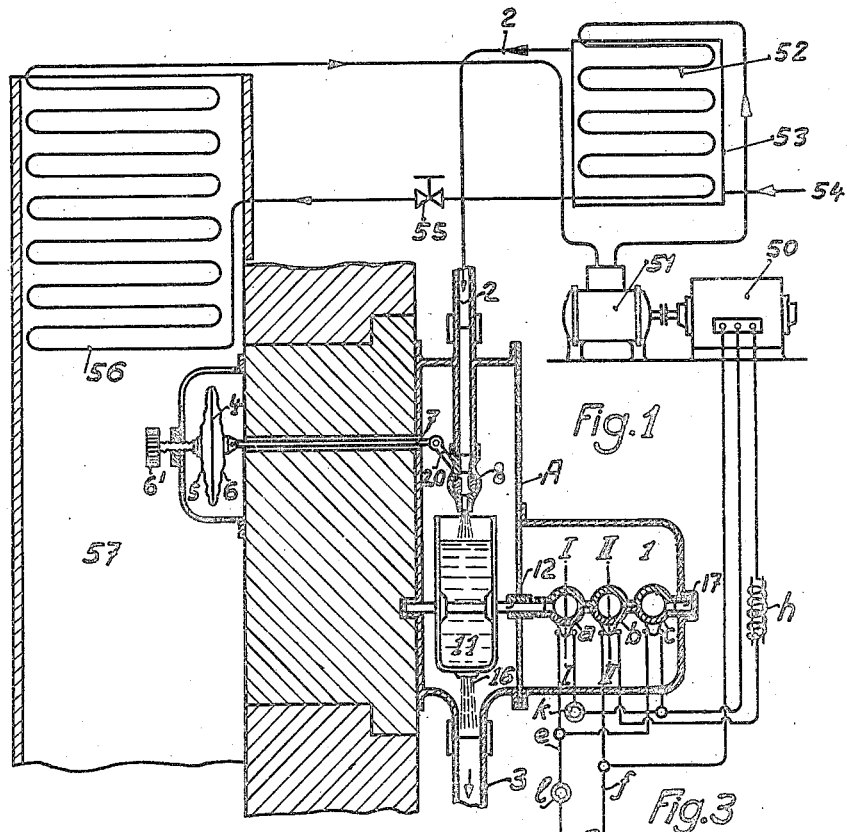
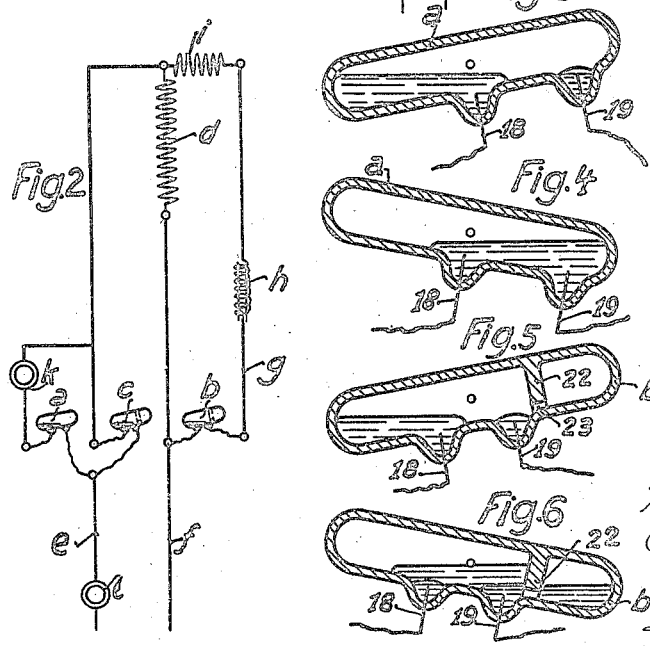
Inventors:
Hans Guyer,
Eduard Ruegger
By
atty.

Aug. 7, 1923.
H. GUYER ET AL
REFRIGERATING MACHINE
Filed May 8, 1922
1,464,277
2 Sheets-Sheet 2
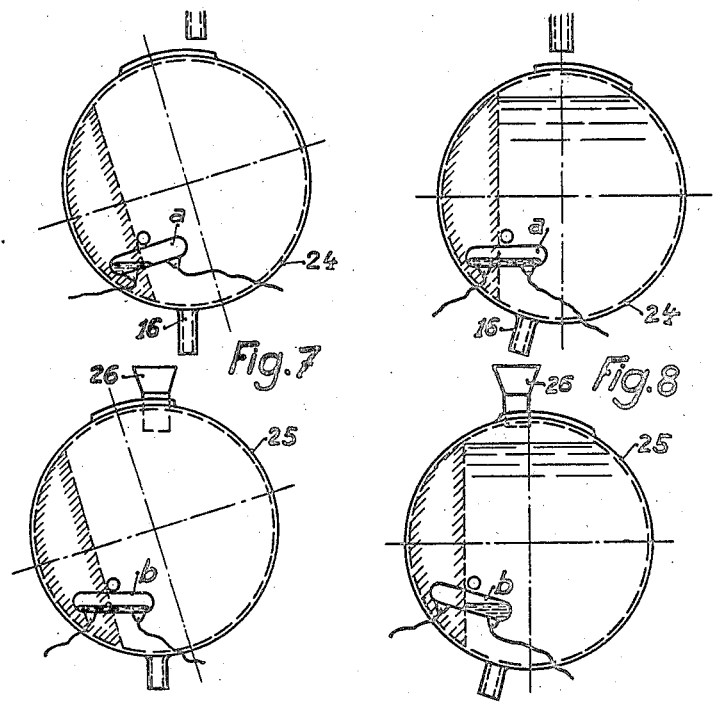
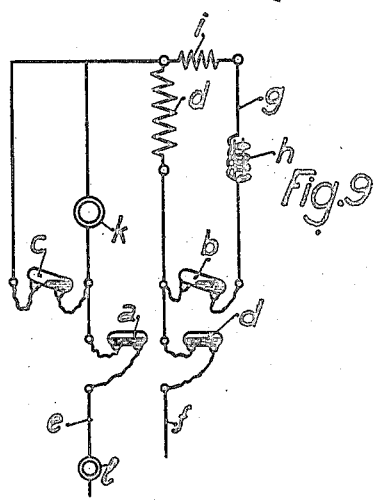
Inventors:
Hans Guyer,
Eduard Rüegger Patented Aug. 7, 1923.

1,464,277

UNITED STATES PATENT OFFICE.

HANS GUYER AND EDUARD RÜEGGER, OF ZURICH, SWITZERLAND, ASSIGNORS TO AKTIENGESELLSCHAFT DER MASCHINENFABRIKEN ESCHER WYSS & CIE., OF ZURICH, SWITZERLAND.

REFRIGERATING MACHINE.

Application filed May 8, 1922. Serial No. 559,338.

*To all whom it may concern:*

Be it known that we, HANS GUYER, a citizen of the Republic of Switzerland, residing at Zurich, Switzerland, and EDUARD RÜEG-GER, a citizen of the Republic of Switzerland, residing at Zurich, Switzerland, have invented certain new and useful Improvements in Refrigerating Machines; and we do hereby declare the following to be a clear, full, and exact description of the invention, such as will enable others skilled in the art to which it appertains to make and use the same, reference being had to the accompanying drawings and to letters or figures of reference marked thereon, which form a part of the specification.

The present invention refers to a device for automatically influencing the working of a refrigerating machine having a condenser that is cooled by water circulation and being driven by a single phase motor with a squirrel-cage rotor and an auxiliary winding. This device is provided with regulating means influenced in a known manner by the cooling action of the refrigerating medium, said regulating means controlling the cooling water utilized for operating a starting-switch for the one phase motor.

When single phase motors with squirrel-cage rotors and an auxiliary winding are utilized for driving refrigerating machines centrifugal switches for causing automatically the motor to be cut in and out can only be used when the machine is of the open type i. e. when it is provided with a shaft projecting beyond the casing. With totally enclosed machines in which the rotor of the single phase motor is enclosed in the casing the utilization of centrifugal switches is not advantageous owing to the contacts having to be provided in the interior of the machine and owing to the electric mains having to be led through the gas-tight walls of the machine. Single phase commutator motors cannot be utilized for the same reasons; therefore with the totally enclosed refrigerating machines driven by single phase motors having squirrel-cage rotors relays of a complicated design have been heretofore used for the purpose of automatically cutting in the motor. The object of the present invention is to provide a substantially simpler arrangement for this purpose.

To this end according to the invention the switch is provided with at least two tiltable liquid contact devices one of them serving for cutting in and out the main current and the second causing the circuit for the auxiliary current of the motor to be closed when the latter is cut in and automatically effecting an interruption of said circuit at the end of the starting period of the motor as soon as a quantity of liquid has flown through a throttling passage from one compartment into another.

Constructional examples of the object of the present invention are illustrated on the accompanying drawings, in which:

Fig. 1 shows diagrammatically a refrigerating machine driven by a single phase motor having a squirrel-cage rotor and an auxiliary winding, some parts of the installation being drawn on a larger scale than other parts, Fig. 2 illustrates the circuit connections of the electrical drive of the refrigerating machine, Figs. 3 and 4 are sections along line I—I of Fig. 1 through the switch arrangement showing on a larger scale one of the glass receptacles containing the contacts in two different operative positions, Figs. 5 and 6 are sections along line II—II of Fig. 1 through the switch arrangement showing on a larger scale two different operative positions of another receptacle containing the contacts;

Figs. 7 and 8 are sections through the tilters at right angles to the axis of rotation of said tilters showing the latter together with the receptacles containing the contacts and which are taking part in the tilting motion in two different operative positions, Fig. 9 shows a modification to a detail of the circuit connections illustrated in Fig. 2.

Referring now to the constructional example illustrated in Figs. 1–6, 1 (Fig. 1) denotes the electrical switch for starting the single phase motor 50 with squirrel-cage rotor and auxiliary winding and serving to drive a compressor 51. Of this motor the main winding $d$ and the auxiliary winding $i$ are shown in Fig. 2. $e$ and $f$ denote the conductors for the main current, $g$ is the conductor for the auxiliary phase and $h$ denotes a choking resistance inserted in the conductor $g$. $k$ is a safety fuse for the working current and $l$ is a fuse for the starting current. The refrigerating medium discharged by the compressor 51 is led into a condenser or liquefier 52 arranged within a tank 53 to which cooling water is supplied by means of a conduit 54. The cooling water is led off through a conduit 2 which forms at the same time the supply conduit (shown on an enlarged scale in Fig. 1) for said cooling water to a device A adapted to regulate and secure the working of the installation. One part of the device A is formed by the switch 1. From the condenser 52 the refrigerating medium flows through a throttle valve 55 into an evaporator 56 arranged within the chamber 57 to be cooled. The cooling water entering the device A is discharged therefrom through the conduit 3. A device 4 adapted to be influenced by the temperature within the chamber 57 consists for example of a diaphragm casing filled with a medium. The medium within the diaphragm casing 4 is for instance a gas in saturated condition and a certain quantity of a liquid, so that a slight change of temperature brought about in the chamber 57 causes a relatively considerable change of pressure in the diaphragm casing 4 the distance of the centers of the two diaphragm walls 5 and 6 being altered thereby. The diaphragm wall 5 being secured in place at its center by the screw $6^1$, the opposite diaphragm wall 6 shifts the movable pin 7 to the right when for instance the cooling action decreases and the temperature rises respectively. The pin 7 actuates through the intermediary of a lever 20 a cock 8, which controls the supply of the cooling water entering at 2 to a tilter 11. The latter may be designed in the same manner as disclosed in the U. S. application Ser. No. 478412 dated June 17, 1921, and it is therefore not deemed necessary to explain the construction and operation of said tilter. It will be sufficient to point out that 12 denotes the axis of rotation about which the tilter 11 is adapted to be rocked, the tilter 11 being provided with an outlet opening 16 for the discharge of the cooling water arranged diametrically opposite to the opening by which the cooling water enters the tilter. The starting switch comprises three glass receptacles $a, b, c$ containing the contacts 18, 19. Said receptacles are operatively connected to the tilter 11, so that a sudden tilting motion of the latter from one of its extreme positions into the other causes a similar tilting motion between the extreme positions of said receptacles. Each of said glass receptacles $a, b, c$ is partly filled with mercury and for the rest evacuated or filled for instance with a neutral gas and they are pivotable about an axle 17 common to all the receptacles. The contact receptacles $b$ and $c$ are further provided with a partition wall 22 (Figs. 5, 6) which subdivides the interior space of said receptacles into two compartments connected together by a throttling opening 23 provided in the partition wall 22. According to the respective inclinations of said receptacles the mercury inside the latter serves either to conduct the current from the one point of contact 18 to the other point of contact 19 (Fig. 4) or the current is interrupted (Figs. 3 and 5). The axis of rotation 17 is an extension of the axle 12 of the tilter 11.

As may be seen from Fig. 2, in which for sake of clearness the three contact receptacles, $a, b, c$ are shown to turn about different axles, the contact receptacle $a$ is adapted to close and to interrupt the main current of the single phase motor. The receptacle $b$ serves to close and to interrupt the auxiliary current flowing in the conductor $g$ whilst the receptacle $c$ allows a bridging over of the service fuse $k$, which is necessary in most cases during the starting period, as the starting current is a multiple of the current used during the ordinary working, and would cause the service fuse to blow as the latter is substantially weaker than the starting fuse.

If now for instance the single phase motor 50 standing still has to be started up on the temperature in the cooling chamber 57 having risen, the cock 8 is opened by the action of the diaphragm 5, 6 so that water is admitted to the tilter 11. As soon as the water has reached a determined level the tilter moves into its other extreme position. In consequence thereof the contact receptacle $a$ is moved from the position shown in Fig. 3 into that shown in Fig. 4, whilst the receptacle $b$ is turned from the position indicated in Fig. 5 into that shown in Fig. 6 and the receptacle $c$ is affected in the same manner as the receptacle $b$. Thereby the contacts 18, 19 contained in the receptacle $a$ are bridged over by the mercury and the mercury contained in the receptacles $b$ and $c$, which bridges over the contacts 18, 19 immediately after the tilting, flows now by degrees from the larger compartment through the throttling opening 23 into the smaller compartment, so that after the expiration of the starting period of the motor 50 the auxiliary current is interrupted by the receptacle $b$ whilst the receptacle $c$ suspends the bridging over of the service fuse $k$. When the cooling water fails or when the temperature in the cooling chamber 57 drops below a determined limit so that the cock 8 is closed by means of the membranes 5, 6, the tilter 11 swings into its other extreme position when a determined lowest level of the water in this tilter is reached, whereby the receptacle $a$ is turned into the position shown in Fig. 3 and the receptacles $b$ and $a$ are turned into the position shown for the receptacle b in Fig. 5. The main circuit is then interrupted as the mercury contained in the receptacle a does no longer establish a connection between the contacts 18 and 19. The single phase motor is thus stopped. In the receptacles b and c the mercury flows back into the larger of the compartments.

The receptacle c may under certain circumstances be dispensed with.

In the constructional example illustrated in Figs. 7 and 8 two tilters 24 and 25 respectively of the type described in the above mentioned application are provided instead of a single tilter for the two receptacles a and b, the latter being of normal design, i. e. without a partition wall. The liquid is supplied to the tilter 25 by means of a stationary funnel 26. The mutual arrangement of the two tilters 24, 25 is so chosen that the tilter 24 in its one extreme position discharges into the tilter 25.

Fig. 7 shows the tilters 24, 25 in the position which they occupy when the driving motor 50 is stopped. Both tilters are empty. The main circuit is interrupted by the receptacle a, the auxiliary circuit in which no current flows is closed by the receptacle b. When the refrigerating machine has to be started up and the cooling water begins to flow the latter fills by degrees the tilter 24, whereby the water escaping by the other opening 16 does at first not enter into the tilter 25. When the water has reached a certain level inside the tilter 24, the latter tilts into the position shown in Fig. 8 whereby the main circuit of the motor is closed by the receptacle a. Consequently the motor starts to run as the circuit of the auxiliary phase is closed for the time being by the receptacle b. In the new position of the tilter 24 the water leaving the latter falls into the tilter 25 which after a certain time, that corresponds to the starting period of the motor, is filled with water to such an extent that the tilter swings from the position shown in Fig. 7 into that shown in Fig. 8. Thereby the auxiliary circuit is interrupted by the receptacle b. The main circuit remains closed as long as cooling water flows through the refrigerating machine.

In certain cases it is desired to have the tension taken off the single phase motor 50 during its stoppage. As shown in Fig. 9 in which similar parts are designated by similar reference numbers as in Fig. 2, a bipolar cut off device may be provided to that end, by inserting into the main circuit besides the contact receptacle a a further contact receptacle d which acts in a manner similar to the receptacle a. When all the receptacles are of normal design i. e. are not provided with a partition wall having a throttle opening two tilters have to be provided one for turning the receptacles a, d and the other for turning the receptacles b, c. If, however, the receptacles a, d are of normal design and the receptacles b, c are provided with a partition wall having a throttling opening a single tilter is required for actuating all the receptacles.

Instead of partly filling the receptacles with mercury they may be filled with another conductive liquid.

We claim:

1. In a refrigerating installation including a condenser cooled by flowing water, and a compressor; a single phase motor having an auxiliary winding and arranged to drive said compressor, a controlling switch for the driving motor comprising at least two automatically operable contact devices independent of one another, one of said contact devices for cutting in and out the main circuit of said motor, the other contact device being traversed by the auxiliary current of the motor when the latter is started and automatically causing an interruption of said auxiliary current after the expiration of the starting period, means to influence said controlling switch in dependency on the cooling water discharged from the condenser, means controlling the outflow of the cooling water from the condenser, and a thermostat element subjected to the temperature of the produced cold and mechanically connected to the means controlling the quantity of water discharged from the condenser.

2. In a refrigerating installation including a condenser cooled by flowing water, and a compressor; a single phase motor having an auxiliary winding and arranged to drive said compressor, a controlling switch for the driving motor comprising a tiltably-arranged, liquid-operated contact device to cut in and out the main circuit of said motor, a second contact device consisting of a receptacle provided with contacts and a main and an auxiliary compartment connected together by a throttling passage and partly filled with mercury, the said contact device being traversed by the auxiliary current when the motor is started and causing an automatic interruption of said auxiliary current after the expiration of the starting period of the motor by the mercury flowing from the main compartment of the contact device into the auxiliary compartment, a fuse inserted in the main circuit of the motor, a third, tiltably-arranged, liquid-operated contact device of similar construction as the second contact device to short-circuit said fuse during the starting period and to interrupt said short-circuiting after the expiration of the starting period by the mercury flowing from the main compartment of the contact device into the auxiliary compartment, means controlling the outflow of the cooling water from the condenser, and a thermostat element subjected to the temperature of the produced cold and mechanically connected to the means controlling the quantity of water discharged from the condenser.

3. In a refrigerating installation including a condenser cooled by flowing water and a compressor; a single-phase motor having a squirrel-cage rotor and an auxiliary winding arranged to drive said compressor, a controlling switch for the driving motor comprising a tiltably-arranged, liquid-operated contact device to cut in and out the main circuit of said motor, a second contact device consisting of a receptacle provided with contacts and a main and an auxiliary compartment connected together by a throttling passage and partly filled with mercury, the said contact device being traversed by the auxiliary current when the motor is started and causing an automatic interruption of said auxiliary current after the expiration of the starting period of the motor by the mercury flowing from the main compartment of said contact device into the auxiliary compartment, a fuse inserted in the main circuit to the motor, a third, tiltable, liquid-operated contact device of similar construction as the second contact device to short-circuit said fuse during the starting period and to interrupt said short-circuiting after the expiration of the starting period by the mercury flowing from the main compartment of the contact device into the auxiliary compartment, a single tilter adapted to operate all three said contact devices and actuated by the cooling water discharged from the condenser, and means to control the quantity of water supplied to the tilter in dependency on the temperature of the produced cold.

4. In a refrigerating installation including a condenser cooled by flowing water and a compressor; a single phase motor having a squirrel-cage rotor and an auxiliary winding and arranged to drive said compressor, a controlling switch for the driving motor comprising a tiltable, liquid-operated contact device inserted in one conductor for the main circuit to cut in and out the main circuit of said motor, a second contact device consisting of a receptacle provided with contacts, and a main and an auxiliary compartment connected together by a throttling passage and partly filled with mercury, the said contact device being traversed by auxiliary current when the motor is started and causing an automatic interruption of said auxiliary current after the expiration of the starting period of the motor by the mercury flowing from the main compartment of said contact device into the auxiliary compartment, a fuse inserted in the main circuit to the motor, a third, tiltably arranged, liquid-operated contact device of similar construction as the second contact device and for short-circuiting said fuse during the starting period and for interrupting said short-circuiting after the expiration of the starting period by the mercury flowing from the main compartment of the contact device into the auxiliary compartment, a fourth, tiltable, contact device inserted in the other conductor of the main supply circuit to the motor and adapted to cut in and out the main circuit of the said motor so that the latter is not under tension when stopping, means to influence said controlling switch in dependency on the water discharged from the condenser, and means influenced by the cold produced, for controlling the quantity of water discharged from the condenser.

5. In a refrigerating installation including a condenser cooled by flowing water, and a compressor; a single-phase motor for driving said compressor and having an auxiliary winding, a controlling switch for said motor having at least two automatically-operable simultaneously-actuated contact devices, one of which maintains a short, definite circuit closing period corresponding to the starting period of said motor, water-actuated means to operate said contact devices by the discharge water from said condenser, a cock controlling said discharge water after it has left said condenser and before it reaches said water-actuated means, and a thermostat subjected to the temperature to be produced and mechanically connected to said cock to control the quantity of water passing to said motor-actuated means and thereby operate said contact devices.

In testimony that we claim the foregoing as our invention, we have signed our names.

HANS GUYER.
EDUARD RÜEGGER.